United States Patent [19]

Cowell et al.

[11] Patent Number: 4,877,944
[45] Date of Patent: Oct. 31, 1989

[54] SELF REGULATING HEATER

[75] Inventors: Mark J. Cowell, San Carlos; Kevin Ladd; Philip S. Carter, Jr., both of Palo Alto, all of Calif.

[73] Assignee: Metcal, Inc., Menlo Park, Calif.

[21] Appl. No.: 59,787

[22] Filed: Jun. 8, 1987

[51] Int. Cl.⁴ .............................................. H05B 3/10
[52] U.S. Cl. ..................................... 219/548; 219/553
[58] Field of Search ............... 219/548, 553, 229, 233, 219/300, 7.5, 10.79

[56] References Cited

U.S. PATENT DOCUMENTS

| | | | |
|---|---|---|---|
| 2,414,482 | 1/1947 | Norman | 219/548 X |
| 4,091,813 | 5/1978 | Shaw et al. | 219/233 X |
| 4,256,945 | 3/1981 | Carter et al. | 219/10.75 |
| 4,456,186 | 6/1984 | Ando | 219/300 |
| 4,745,264 | 5/1988 | Carter | 219/229 X |
| 4,752,670 | 6/1988 | Traub et al. | 219/229 X |

Primary Examiner—Clifford C. Shaw
Assistant Examiner—M. Lateet
Attorney, Agent, or Firm—Shlesinger & Myers

[57] ABSTRACT

A self regulating heater comprises a non-conductive, magnetic core having a coil wound about it and providing pole pieces extending into contact or very near contact with a surrounding ferromagnetic member which in turn may be surrounded by and in intimate contact with a non-magnetic low resistance member; the magnetic member having an effective Curie temperature at the temperature to be maintained.

6 Claims, 1 Drawing Sheet

SELF REGULATING HEATER

The present invention refers to an electric heater and more particularly to a temperature self regulating heater employed as a tool for heating fusible and other types of heat activated bonding materials.

In U.S. Pat. No. 4,256,945 there is disclosed a first version of a soldering iron employing Curie temperature regulating concepts. An outer conical copper shell is lined with a ferromagnetic material, for instance, alloy 42 having a nominal mu of 400 and high electrical resistance, $75 \times 10^{-6}$ ohm-cm. A copper rod is secured to the region of the apex of the cone and extends along the conic axis interiorly of the cone. When a high frequency, constant current is applied between the end of the rod remote from the conic's apex and the base of the cone, current flows primarily in the ferromagnetic material due to skin effect. When the device approaches Curie temperature, the ferromagnetic material becomes non-magnetic and the current flows primarily in the copper shell. Since the current is constant and the copper has substantially less electrical resistance than the ferromagnetic material, Joule heating is greatly reduced. In consequence the temperature is regulated near Curie temperature for the ferromagnetic material chosen.

A modified form of heater designed to increase its impedance to better match the current source is disclosed in co-pending U.S. patent application Ser. No. 666,346 filed Oct. 30, 1984 now U.S. Pat. No. 4,745,264; EPO- Application No. 85305948.3 published May 7, 1986, inductive coupling is employed to couple a constant current into a ferromagnetic layer surrounding and contacting a copper rod forming a rearward extension of the tip of a soldering iron. The coil employed to couple current into the magnetic material surrounds the material and an outer magnetic layer is disposed outside the coil to act as a magnetic shield and restrict spreading of the magnetic flux.

Experiments were recently conducted to increase the efficiency of such an iron so that the heater can be made to operate efficiently at still higher power than permitted by the current design. The experiments determined that if the shank of the tip was cooled, placed under a heavy load, the heater responded immediately producing full power to bring the heater up to temperature as quickly as possible. When the tip itself was cooled under heavy load, the heater did not come up to full power and it took longer for the heater to achieve design temperature.

Thus it was apparent that particularly under heavy loads, the displacement of the heater from the tip of the device had an adverse effect on the ability of the tip to maintain operating temperatures.

BRIEF DESCRIPTION OF THE PRESENT INVENTION

The present invention provides a heater in which the heater element is energized by a coil and core located interiorly of the heater and thus may be located quite close to the heater working surface while preserving the impedance matching available with inductive coupling. Specifically the present invention employs a non-conductive magnetic core material, such as compressed powdered iron or a ferrite, to reduce losses in the core while maintaining a high flux density. As indicated the core is located interiorly of the heater. The problem with placing the core and its associated coil interiorly of the heater is that the flux density of an inductor is far lower exteriorly of the core than in its interior. Thus the current flowing in the heater is relatively low under these circumstances and the heater efficiency is poor.

According to the present invention the above problem is overcome by using a shaped core so as to focus the flux in the ferromagnetic material of the heater. The core may be "I" or "E" shaped, or the like, in cross-section and has a coil wound about its narrow section(s). The heater preferably has a hollow cylindrical interior in which the core is located whereby the cross member of an I-shaped or legs of an E-shaped cross-section core concentrate the flux in the adjacent magnetic material. The magnetic material is preferably surrounded by copper or the like so as to provide a low electrical resistant, good heat conductive path for the heater.

In consequence of this arrangement the heater is energized at a location quite close to and in some instances immediately interiorly of the working surface of the tool in which the heater is incorporated or associated, increasing efficiency and its constant temperature attributes without sacrificing the impedance matching achieved with an inductive coupling circuit. In addition placement of the core and coil interiorly of the heater greatly decreases the problem of electromagnetically shielding the heater, that is, preventing radiation from the device and the development of circulating currents on the exterior of the heater. For a full discussion of the parameters necessary to provide such shielding reference is made to the subject matter of Carter et al co-pending application Ser. No. 243,777, filed Mar. 16, 1981, now U.S. Pat. No. 4,701,587, assigned to the same assignee as the present invention and incorporated herein by reference.

Summarizing, the heater structure comprises a coil wound core of non-conductive, magnetic material located interiorly of a heater having a layer of magnetic material surrounding the core and preferably a layer of conductive material surrounding the magnetic material; the core being closely fitted within the heater and being shaped to concentrate the magnetic flux in the heater.

DETAILED DESCRIPTION OF THE DRAWINGS

Figure 1:
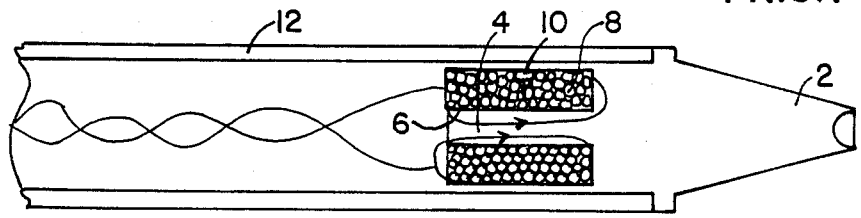
FIG. 1 illustrates a prior art soldering iron cartridge.

Referring now specifically to FIG. 1 of the accompanying drawings there is illustrated a soldering iron of the prior art type as described in EPO Application Ser. No. 85305948.3, filed Aug. 21, 1985 and published May 7, 1986. A soldering iron is illustrated for purposes of example only. The concepts disclosed are applicable to any self regulating heater arrangement.

The iron has a tip 2, preferably of copper, which has an extension or rod 4 extending rearwardly therefrom The rod is surrounded by a layer 6 of magnetic material which in turn is surrounded by a multiturn coil 8 adapted to be energized by a high frequency constant current. A magnetic shield 10 surrounds the coil to limit spreading of the magnetic flux. The entire structure rearwardly of the tip 2 is surrounded by a non-magnetic steel tube 12.

As previously indicated there are basically two problems with the design of FIG. 1 when it is necessary to operate the device at very high wattage levels relative to the wattage for which the device is designed.

The first problem is that in spite of the relatively large diameter of the rod 4, the heater is sufficiently removed from the tip 2 to materially affect the response of the heater to large changes in heavy loads.

Figure 2:
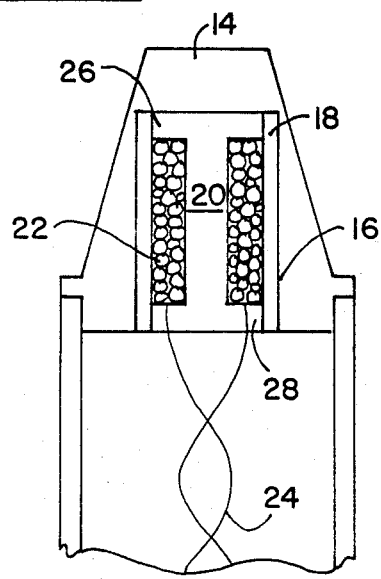
FIG. 2 illustrates one embodiment of a soldering iron cartridge according to the present invention.

Reference is now made to FIG. 2 of the accompanying drawings illustrating one embodiment of the present invention. A soldering iron comprises a truncated conical tip 14 preferably of copper and having a cylindrical recess 16 formed therein axially of the cone. The cylindrical recess 16 is lined with a feromagnetic material 18 having a Curie temperature that defines the desired regulated temperature of the iron. A magnetic, essentially non-conductive bobbin or core 20 is inserted in the cylindrical recess 16 and has wound thereon a coil 22. The coil 22 is intended to be energized by a constant current source via leads 24.

The core 20 is preferably made of a ferrite material because of its high permeability and high resistivity; the former to sustain large quantities of flux and the latter to reduce eddy current losses. Materials having small hysteresis loops are also preferred. The core 20 in this embodiment is I-shaped in cross-section and thus provides flanges 26 and 28 of a diameter to preferably cause the circumference of the flanges to contact the inner bore of the magnetic material 18. At the worst the flanges should define a small air gap between their outer circumferences and the magnetic material; the gap being such as not to introduce a significant magnetic reluctance into the magnetic circuit.

As to the ferrite material to be used such materials are available with permeabilities of 20 to 5000, a temperature range of 120° to 500° C. and which operate at frequencies from 180 KHz to 180 MHz. One such material is available from Fair-Rite Products, Product No. 9661103001, a ferric oxide, with other oxides. In one application the transformer structure comprised a two layer, 7 turn solenoid of 0.010" magnet wire wrapped around a ferrite bobbin to provide a 50 ohm resistance and a 20 ohm reactance. The bobbin used had an O.D. of 0.141 and an ID of 0.070. The system is matched to approximately 50 ohms resistance with an 85 pf capacitor in series with the coil. The heater comprised an 0.0007 inch layer of alloy 45 on an 0.005 layer of copper. The heater operated at an efficiency of 96.5% efficiency at 10 MHz and 92% at 13.56 MHz, the standard heater frequency of operation. Efficiency in this context is defined as the ratio of heat generated by the heater to the total electrical power supplied to the device.

The mu of the material is approximately 125 and the resistivity is approximately $10^8$ ohm-cm. The Curie temperature of the ferrite should be above the Curie temperature of the heater material.

The heater unit of FIG. 2 may be employed independently of the tip 14; that is the ferrite core 20 and the coil 22 may be mounted on a rod, for instance, and inserted into a snug fitting sleeve of copper having an inner lining of ferromagnetic material whereby to heat the sleeve to solder it to a pipe or the like. Such is illustrated in FIG. 3 where the core and coil are designated by the same reference numerals as in FIG. 3 In this embodiment the sleeve to be soldered bears the reference numeral 30 and the element or pipe to which it is to be soldered has reference numeral 32.

The sleeve 30 is, for instance, a copper tube 34 lined interiorly with a ferromagnetic material 36. The core 30 is snugly received in the sleeve 20 which is to be joined to tube 32.

Figure 3:
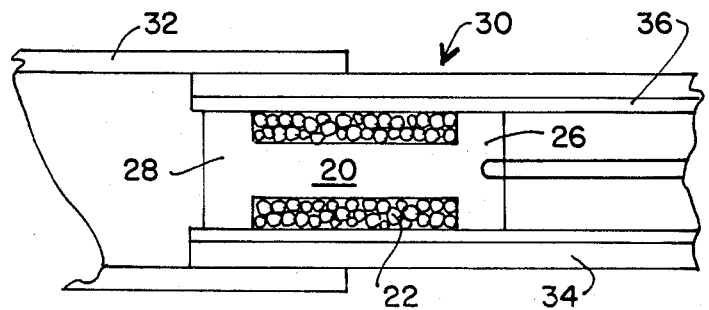
FIG. 3 is a heater structure according to the present invention employed independently of a soldering iron cartridge.

In a system such as FIG. 3, the system may be readily adapted to fuse materials of different fusion temperatures. Various temperatures may be had by lining sleeves 30 with ferromagnetic materials of different Curie temperatures. Alloys 42 and 45 are often used each having a different Curie temperature. Many other materials may also be used to provide a wide range of temperature selections. This concept may be carried over into replaceable tip soldering irons such as disclosed in U.S. application Ser. No. 904,298, filed Sept. 8, 1986 of Cowell.

Figure 4:
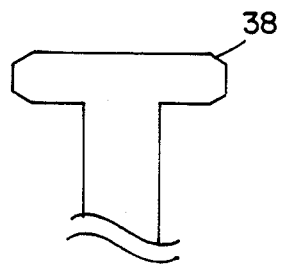
FIG. 4 illustrates a tapered pole that may be employed with the core of the structure of the present invention.

Referring now to FIG. 4 of the accompanying drawings, there is illustrated a core having shaped pole pieces to focus the flux into the adjacent ferromagnetic material and thus reduce leakage flux. The tapering is designated by reference numeral 38. It should be noted that the dimensions of the tapered member must be large enough to prevent saturation of the pole piece which of course would increase rather than decrease leakage flux.

The core 20 of FIGS. 2 and 3 and 4 may take many shapes such as a square, rectangle, etc. as opposed to cylindrical, depending upon the interior shape of the aperture into which it is to be fitted. Further the heater is not limited to a magnetic layer on a copper layer but may be a magnetic layer on a ferromagnetic layer of different Curie temperature as disclosed in U.S. application Ser. No. 543,443 now U.S. Pat. No. 4,695,713 or such a structure with a thin copper layer between the two magnetic layers, Ser. No. 445,862 now U.S. Pat. No. 4,752,673.

It has been stated that the core has a high resistivity so as to reduce core losses and thus produce little heating thereof. There may be instances where some core heating may be desired and thus a ferromagnetic core with some loss would be desirable. In such a case, the Curie temperature of such material should be above the Curie temperature of the ferromagnetic material of the heater. Thus two heat sources are supplied, one with a variable temperature and one with a more constant temperature. In such case the ranges of the cyclic temperature would be less.

The term "constant current" as employed herein does not mean a current that cannot increase, but means a current that obeys the following formula $$\frac{\Delta |I|}{|I|} > -\tfrac{1}{2} \frac{\Delta R}{R}$$

where I is the load current. Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is controlled in accordance with the above formula, autoregulation is achieved. Thus, when large self regulating ratios are not required, constraints on the degree of current control may be relaxed thus reducing the cost of the power supply.

The above equation is derived by analyzing the equation:

$$P \times [I^2 R]$$

where P is power and I is the current in the load. Differentiating with respect to R $$\frac{dP}{dR} = |I|^2 + 2R|I|\frac{dI}{dR}$$

to satisfy the requirements for self regulation dP/dR>0. Thus, $$|I^2| + 2R|I|\frac{d|I|}{dR} > 0$$

which reduces to the above equation. It should be noted, however, that the more constant the current the better the self regulation.

Once given the above disclosure, many other features, modifications and improvements will become apparent to the skilled artisan. Such other modifications, features and improvements are, therefore, considered a part of this invention, the scope of which is to be determined by the following claims.

What is claimed is:

1. A heater comprising:
   a conductive member,
   a ferromagnetic material lining a surface of said conductive member,
   a magnetic core of a material having a higher electrical resistivity and Curie temperature than said ferromagnetic material and located internally of said ferromagnetic material,
   a coil wound on said core,
   said core being located and shaped to tightly couple flux in said core to said ferromagnetic material, and
   means adapted to connect said coil to a constant, alternating current source of sufficient amplitude to heat said ferromagnetic material to a temperature approaching its Curie temperature.

2. A heater structure comprising,
   a core of high permeability, low conductivity material,
   a coil wound on said core,
   a hollow member having a high permeability disposed about said core and having a Curie temperature lower than the Curie temperature of said core for determining maximum temperature of said heater,
   said hollow member providing a low reluctance path through said core and said hollow member.

3. A heater structure according to claim 2 wherein said core is a ferrite having a resistivity of at least $10^7$ ohm-cm and a small BvH loop located interiorly of said hollow member.

4. A heater according to claim 1 or claim 2 wherein the cross-section of said core is I-shaped and said core is solid.

5. A heater according to claim 2 or claim 1 wherein said core is a compressed powdered iron having a resistivity of at least $10^7$ ohm-cm and a small BvH loop.

6. A heater according to claim 1 or claim 2 wherein the axial cross-section of said core is E-shaped and wherein said core is solid.

* * * * *